3,277,056
N-3-OXOHYDROCARBON-SUBSTITUTED ACRYL-
AMIDES AND POLYMERS THEREOF
Lester E. Coleman, Cleveland, Ohio, assignor to The
Lubrizol Corporation, Wickliffe, Ohio, a corporation of
Ohio
No Drawing. Filed Nov. 27, 1963, Ser. No. 326,394
26 Claims. (Cl. 260—63)

This application is a continuation-in-part of our previously filed application Serial No. 148,712, filed October 30, 1961, now abandoned.

This invention relates to acrylamides and their polymers including both homopolymers and interpolymers.

Acrylamides can be polymerized to form polymers that are useful in the manufacture of plastics, resins, synthetic lubricants, fibers, additives in hydrocarbon oils, etc. The utility of the polymers is predicated to a large measure upon the polar character of the amide radical which causes the polymers to be compatible with many other organic substances, and a principal object of this invention is to provide acrylamides in which the polar character of the amide radical is enhanced and to provide polymers of such acrylamides.

It is also an object of this invention to provide novel compositions of matter.

It is also an object of this invention to provide methods for preparing acrylamides and polymers of acrylamides.

It is further an object of this invention to provide polymers of acrylamides which are suitable for use in organic substances, especially in hydrocarbon oils.

It is still further an object of this invention to provide hydrocarbon oil compositions such as fuels and lubricants containing polymers of acrylamides.

These and other objects are attained in accordance with this invention by providing an N-3-oxohydrocarbon-substituted acrylamide having the structural formula

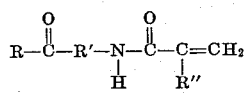

wherein R and R'' are each selected from the class consisting of hydrogen and lower alkyl radicals and R' is selected from the class consisting of ethylene and a lower alkyl-substituted ethylene radical.

The lower alkyl radicals are those containing no more than about 10 carbon atoms and include also the cycloalkyl radicals. They are exemplified by methyl, ethyl, propyl, isopropyl, butyl, sec-butyl, n-pentyl, cyclohexyl, cyclopentyl, isooctyl, n-decyl, and 4-ethyl-2-hexyl radicals.

The radical R' is ethylene or an ethylene radical having at least one lower alkyl substituent on the carbon atom which is attached directly to the nitrogen atom of the acrylamide. For purposes of convenient reference, the two carbon atoms of the principal chain of the ethylene radical are designated numerically beginning from the nitrogen atom; i.e., the carbon atom attached directly to the nitrogen atom is designated as atom number 1 and the other as atom number 2. Thus, the R' radicals are illustrated by ethylene, 1-methyl ethylene, 1,1-dimethyl ethylene, 1,1,2-trimethyl ethylene, 1-methyl-1-ethyl ethylene, 1-methyl-1-isobutyl ethylene, 1-ethyl-1-isopropyl ethylene, 1,1-diisopropyl ethylene, 1,2-dimethyl ethylene, 1-n-butyl-1-n-pentyl ethylene, 1-methyl-1-cyclohexyl ethylene, etc.

The radical R'' is preferably a hydrogen radical. In some instances it may be a lower alkyl radical such as illustrated previously.

Specific examples of the N-3-oxohydrocarbon-substituted acrylamides include

N-3-oxopropyl acrylamide,
N-3-oxobutyl acrylamide,
N-3-oxo-1-methyl-butyl acrylamide,
N-3-oxo-1,1-dimethyl-butyl acrylamide,
N-3-oxo-1-methyl-1,3-dicyclohexyl-propyl acrylamide,
N-3-oxo-1,2-dimethyl-1-ethyl-butyl acrylamide,
N-3-oxo-1,5-dimethyl-1-isopropyl-hexyl acrylamide,
N-3-oxo-1,1-diisobutyl-2-isopropyl-5-methyl-hexyl
 acrylamide,
N-3-oxo-1,1-dibutyl-2-n-propyl-heptyl acrylamide,
N-3-oxo-1-methyl-butyl alpha-methyl acrylamide, etc.

A convenient method for making the N-3-oxohydrocarbon-substituted acrylamides of this invention involves the reaction of a beta-hydroxy oxohydrocarbon, i.e., ketone or aldehyde, with one mole of an acrylonitrile in the presence of at least one mole of sulfuric acid per mole of the acrylonitrile used and subsequently hydrolyzing the reaction mixture. The reaction is illustrated by that of diacetone alcohol (i.e., 4-hydroxy-4-methyl-2-pentanone) with acrylonitrile as represented by the following equations:

(A) 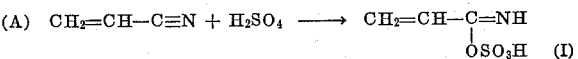

(B) 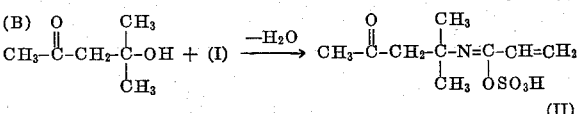

(C) 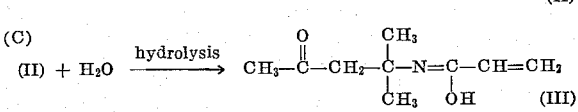

(D) 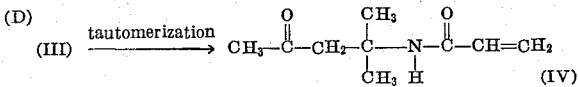

It is to be understood, of course, that the above equations are merely illustrative and may be accurate only as to the stoichiometry of the reaction.

The reaction of the acrylonitrile with the hydroxy ketone or aldehyde is best carried out at a temperature below about 100° C. A higher temperature appears to promote undesirable side reactions such as polymerization of the acrylonitrile, or polymerization of the acrylamide product. The preferred temperature for the reaction is within the range from about 0° C. to about 70° C. The reaction is in most instances exothermic; hence, external cooling may be necessary to maintain the reaction temperature within the stated ranges.

The hydrolysis step is effected most conveniently by contacting the reaction product of the hydroxy ketone or aldehyde and the acrylonitrile with ice or a mixture of ice and water, care being taken to maintain the temperature for hydrolysis below about 100° C., preferably between from about 0° C. to 70° C. The product of hydrolysis is the desired acrylamide. It may be purified by distillation in vacuum, although in many instances the product is of sufficient purity that any purification step is optional. Inasmuch as the acrylamide is susceptible to polymerization, distillation should be carried out in the presence of a polymerization inhibitor such as hydroquinone.

The beta-hydroxy oxohydrocarbons are preferably aliphatic. They in turn are prepared by the condensation of two moles of an aliphatic oxohydrocarbon, viz., ketone or aldehyde, having at least one alpha-hydrogen atom, i.e., hydrogen atom attached to the carbon atom which in turn is attached directed to the carbonyl group of the ketone or aldehyde. Such condensation is otherwise known in the art as the "aldol" condensation. It is illustrated by the formation of diacetone alcohol or the formation of beta-hydroxy-butanal from acetone or acetaldehyde, respectively, as represented by the following equations:

(E) 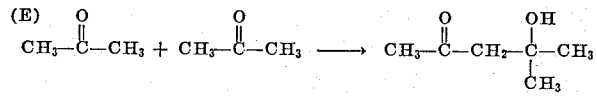

(F) 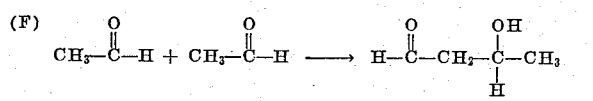

The condensation is catalyzed by either an acid such as sulfuric acid or a base such as an alkali and takes place readily upon mixing the aldehyde or ketone with the catalyst. It can be effected at temperatures within wide ranges such as from room temperature to 200° C.

It is apparent that the condensation of two moles of diethyl ketone results in a beta-hydroxy heptanone (viz., 5-hydroxy-4-methyl-5-ethyl-3-heptanone) and that other ketones or aldehydes having an alpha-hydrogen atom can be converted by such condensation to a wide variety of beta-hydroxy oxohydrocarbons. It is likewise apparent that heterogeneous condensations of one mole of a ketone or aldehyde with another mole of a different ketone or aldehyde results also in the beta-hydroxy oxohydrocarbons which are useful in the reaction with acrylonitriles to produce the N-3-oxohydrocarbon-substituted acrylamides.

A more convenient method for preparing the N-3-oxohydrocarbon-substituted acrylamides involves the reaction of an acrylonitrile with two moles of the oxohydrocarbon described previously (i.e., a ketone or aldehyde having at least one alpha-hydrogen atom) in the presence of at least one mole of sulfuric acid. The conditions for the reaction are substantially the same as those for the reaction of the previous method. One theory regarding the reaction of this method postulates that the two moles of the oxohydrocarbon condense in situ to form the beta-hydroxy oxohydrocarbon (as described by equation E or F previously) and that the beta-hydroxy oxohydrocarbon thus formed combines with the acrylonitrile in accordance with the reaction as illustrated by equations A, B, C, and D previously. In this respect, the second method may be regarded as a modified version of the first method.

Still another method for preparing the N-3-oxohydrocarbon-substituted acrylamides is available, which involves the reaction of an acrylonitrile with an alpha, beta-unsaturated ketone or aldehyde such as is obtained by the dehydration of the beta-hydroxy oxohydrocarbon described above. The conditions for this reaction likewise are substantially the same as those for the reactions of the first two methods. Specific examples of the unsaturated ketones or aldehydes are mesityl oxide, 1-butene-3-one, and 2-pentenal.

The N-3-oxohydrocarbon-substituted acrylamides are for the most part liquids, amorphous solids, or crystalline solids. Their principal utility is as monomers for conversion to polymers which are useful as additives in paints, fuel oils, lubricants, and insecticidal compositions. It will be understood that for the purposes of the specification and claims of this invention the term "polymers" is used in a generic sense to include homopolymers, co-polymers, terpolymers, or other interpolymers.

The N-3-oxohydrocarbon-substituted acrylamides are usually polymerized by the free-radical polymerization technique (also known as the addition polymerization technique). Such technique consists of contacting the monomer with a polymerization initiator either in the absence of presence of a diluent at a temperature usually between 0° C. and 200° C. The polymerization initiator is a substance capable of liberating a free-radical under the conditions of polymerization, e.g., benzoyl peroxide, tert-butyl hydroperoxide, cumyl peroxide, potassium persulfate, acetyl peroxide, hydrogen peroxide, azobis-isobutyronitrile, or perbenzoic acid. For reasons of economy, benzoyl peroxide or azobisisobutyronitrile is most commonly used.

The N-3-oxohydrocarbon-substituted acrylamides may also be polymerized or co-polymerized using an anionic initiator such as sodium naphthylene or butyl lithium in tetrahydrofuran solution or sodium metal in liquid ammonia solution.

The polymerization of N-3-oxohydrocarbon-substituted acrylamides may also be effected by other polymerization techniques such as, for example, by the use of Ziegler type catalysts, gamma ray irradiation, or thermal techniques.

The diluent for the polymerization mixture may be either an inert solvent such as benzene, toluene, xylene, cyclohexane, n-hexane, naphtha, tetrahydrofuran, white oil, or dodecane; or a non-solvent such as water or liquid ammonia. Thus, the polymerization can be carried out in bulk, solution, emulsion, or suspension.

The temperature for the polymerization depends on the catalyst system employed and to some extent upon the nature of the monomers to be polymerized. Thus, the copolymerization of acrylonitrile with the acrylamide of this invention may be catalyzed by an anionic initiator at temperatures from about −100° C. to 50° C., preferably at −70° C. to 0° C. On the other hand, the optimum temperatures for effecting the free radical catalyzed homo-polymerization of the acrylamide of this invention, the temperature is usually within the range of from 0° C. to 100° C., preferably 30° C. to 80° C. Similarly, the optimum temperatures for effecting the free radical catalyzed interpolymerization of the acrylamide with one or more polymerizable co-monomers will vary according to the reactivity of these monomers. In most instances such temperatures likewise are within the range from about 0° C. to 100° C.

A large variety of co-monomers can be used to form interpolymers with the acrylamides of this invention. For the most part, the co-monomers are polymerizable vinyl monomers. They include, for example, (1) esters of unsaturated alcohols, (2) esters of unsaturated acids, (3) vinyl cyclic compounds, (4) unsaturated ethers, (5) unsaturated ketones, (6) unsaturated amides, (7) unsaturated aliphatic hydrocarbons, (8) vinyl halides, (9) esters of unsaturated polyhydric alcohols, (e.g., butenediol), (10) unsaturated acids, (11) unsaturated acid anhydrides, (12) unsaturated acid chlorides, and (13) unsaturated nitriles, etc.

Specific illustrations of such compounds are:

(1) Esters of unsaturated alcohols: Allyl, methallyl, crotyl, 1-chloroallyl, 2-chloroallyl, cinnamyl, vinyl, methvinyl, 1-phenallyl, butenyl, etc., esters of (a) saturated acids such as for instance, acetic, propionic, butyric, valeric, caproic, stearic, etc.; (b) unsaturated acids such as acrylic, alpha-substituted acrylic (including alkacrylic, e.g., methacrylic, ethacrylic, propacrylic, etc., and arylacrylic such as phenylacrylic, etc.), crotonic, oleic, linoleic, linolenic, etc. (c) polybasic acids such as oxalic, malonic, succinic, glutaric, adipic, pimelic, suberic, azelaic, sebacic, etc. (d) unsaturated poly-basic acids such as maleic, fumaric, citraconic, mesaconic, itaconic, methylene malonic, acetylene dicarboxylic acid, aconitic, etc., (e) aromatic acids, e.g., benzoic, phenylacetic, phthalic, terphthalic, benzoylphthalic, etc.

(2) The esters of saturated alcohols such as methyl, ethyl, propyl, isopropyl, butyl, isobutyl, sec-butyl, tert-butyl, 2-ethyl-hexyl, cyclohexyl, behenyl, etc., of unsaturated aliphatic monobasic and polybasic acids, examples of which are illustrated above. The alkyl acrylates and methacrylates in which the alkyl radical contains from 1 to about 30 carbon atoms are especially useful because of their reactivity in interpolymerization and the particular utility and effectiveness of their interpolymers for the purposes of this invention.

(3) Easters of unsaturated polyhydric alcohols, e.g., butenediol, etc., with saturated and unsaturated aliphatic and aromatic, monobasic and polybasic acids, illustrative examples of which appear above.

(4) Vinyl cyclic compounds including (a) monovinyl aromatic hydrocarbons, e.g., styrene, o-, m-, p-chlorostyrenes, -bromostyrenes, -fluorostyrenes, -methylstyrenes, -ethylstyrenes, -cyanostyrenes, di-, tri-, and tetra, etc., -chlorostyrenes, -bromostyrenes, -fluorostyrenes, -methylstyrenes, -ethylstyrenes, -cyanostyrenes, vinyl naphthalene, vinyl cyclohexane, vinyl furane, vinyl pyridine, vinyl benzofurane, divinyl benzene, trivinyl benzene, allyl benzene, N-vinyl carbazole, N-vinyl pyrrolidone, N-vinyl oxazolidone, etc.

(5) Unsaturated ethers such as, e.g., methyl vinyl ether, ethyl vinyl ether, cyclohexyl vinyl ether, octyl vinyl ether, diallyl ether, ethyl methallyl ether, allyl ethyl ether, allyl ether, etc.

(6) Unsaturated ketones, e.g., methyl vinyl ketone, ethyl vinyl ketone, etc.

(7) Unsaturated amides, such as acrylamide, N-methyl acrylamide, N-phenyl acrylamide, N-allyl acrylamide, N-methylol acrylamide, N-allyl caprolactam, etc.

(8) Unsaturated aliphatic hydrocarbons, for instance, ethylene, propylene, butenes, butadiene, isoprene, 2-chloro-butadiene, alpha olefins, etc.

(9) Vinyl halides, e.g., vinyl fluoride, vinyl chloride, vinyl bromide, vinyl iodide, vinylidene chloride, vinylidene bromide, allyl chloride, allyl bromide, etc.

(10) Unsaturated acids, for example, acrylic, methacrylic, propacrylic, etc., examples of which appear above.

(11) Unsaturated acid anhydrides, e.g., maleic, citraconic, itaconic, cis-4-cyclohexene-1,2-dicarboxylic, bicyclo(2,2,1)5-heptene-2,3-di-carboxylic, etc.

(12) Unsaturated acid halides such as cinnamoyl, acrylyl, methacrylyl, contonyl, oleyl, fumaryl, etc.

(13) Unsaturated nitriles, e.g., acrylonitrile, methacrylonitrile and other N-substituted acrylonitriles.

The relative proportions of the N-3-oxohydrocarbon-substituted acrylamides and the vinyl co-monomers to be used in interpolymerization depend upon the reactivity of these monomers as well as the properties desired for the interpolymers to be formed. To illustrate, interpolymers in which rigidity is desired are obtained by polymerization of a mixture of monomers having few substitutions or substitutions of relatively short chain length. If a still higher degree of rigidity is desired, a monomer mixture may be used, in which a small amount of a bifunctional monomer is included such as divinylbenzene which will cross link the polymer. On the other hand, interpolymers having a high degree of solibility in a hydrocarbon oil are obtained from a polymerization mixture containing a relatively high proportion of an oil-solubilizing monomer, i.e., one having an aliphatic group containing at least about 8 carbon atoms. For most applications, it has been found that the oil-solubilizing monomer should comprise at least about 50% (by weight), preferably at least about 75%, of the interpolymer.

The following examples are illustrative of the methods for preparing the N-oxohydrocarbon-substituted acrylamides.

EXAMPLE 1

A mixture of 185.5 grams (3.5 moles) of acrylonitrile and 406 grams (7 moles) of acetone is added dropwise to 686 grams (7 moles) of concentrated sulfuric acid while the reaction mixture is maintained by external cooling at a temperature between 5° C. and 25° C. Thereafter the mixture is allowed to warm up to 35°–40° C. and then poured slowly over ice. The resulting mixture is neutralized with sodium hydroxide and the aqueous layer extracted with benzene. The organic layer and the benzene solution are combined, dried with calcium chloride, and filtered. The filtrate is heated to distill off benzene. The residue is distilled in vacuum and N-1, 1-dimethyl-3-oxobutyl acrylamide is collected as the distillate at 93°–100° C./0.1–0.3 mm. having a nitrogen content of 8% (theory: 8.3%) and a molecular weight of 163 (theory 169).

EXAMPLE 2

An N-3-oxohydrocarbon-substituted acrylamide is prepared by the process in accordance with Example 1 except that acetone is replaced with methyl ethyl ketone (505 grams, 7 moles). The product is collected as the distillate at 97°–103° C./0.1–0.3 mm. and is found to have a nitrogen content of 6.9%.

EXAMPLE 3

An N-3-oxohydrocarbon-substituted acrylamide is prepared by the process in accordance with Example 1 except that acetone is replaced with methyl isobutyl ketone (701 grams, 7 moles). The product is collected as the distillate at 103°–110° C./0.3–0.5 mm.

EXAMPLE 4

A mixture of 265 grams (5 moles) of acrylonitrile and 581 grams (5 moles) of diacetone alcohol (i.e., 4-hydroxy-4-methyl-6-pentanone) is added portionwise below 40° C. to 735 grams (7.5 moles) of concentrated sulfuric acid. The reaction mass is poured over ice and neutralized with sodium hydroxide. The inorganic layer is extracted with benzene with the benzene extract combined with the organic layer from the neutralization mixture. The combined layers are heated to distill off benzene and the residue is treated with petroleum ether to give a precipitate, viz., N-1,1-dimethyl-3-oxobutyl acrylamide and is found to have a nitrogen content of 8.3% and a molecular weight of 176.

EXAMPLE 5

A mixture of 159 grams (3 moles) of acrylonitrile and 294 grams (3 moles) of mesityl oxide is added to 323 grams (3.3 moles) of concentrated sulfuric acid in 45 minutes at a temperature between 25°–45° C. The resulting mixture is placed in a warm water bath for 16 hours, hydrolyzed with ice, and neutralized with sodium hydroxide. The neutralized mixture is extracted with benzene and the benzene layer then dried, filtered, and heated to 80° C./42 mm. The residue is heated further to give the N-1,1-dimethyl-3-oxobutyl acrylamide as the distillate boiling at 153°–183° C./20 mm. and having a nitrogen content of 8.1%.

EXAMPLE 6

The N-3-oxohydrocarbon-substituted acrylamide of Example 1 is prepared by the process in accordance with Example 1 except that the ketone is replaced with 4-methoxy-4-methyl-2-pentanone (on a molar basis).

EXAMPLE 7

The N-1,1-dimethyl-3-oxobutyl acrylamide of Example 1 is polymerized by placing 15 grams of the acrylamide, 15 grams of benzene, and 0.1 gram of azobisisobutyronitrile in a sealed bottle in a nitrogen atmosphere and placing the bottle in a constant temperature bath at 50°–53° C. for 24 hours. The resulting benzene solution is diluted with methanol and then mixed with water to precipitate a pale yellow solid polymer of the acrylamide.

EXAMPLE 8

A copolymer of decyl acrylate and the acrylamide of Example 1 is obtained by placing 36 grams of decyl acrylate, 4 grams of the acrylamide, 40 grams of benzene, and 0.1 gram of azobis-isobutyronitrile in a sealed bottle in a nitrogen atmosphere and placing the bottle in a constant temperature bath at 52° C. for 20 hours. The

EXAMPLE 9

A copolymer of the acrylamide of Example 1 and a fumarate is prepared by stirring 53 grams (0.315 mole) of the acrylamide, 147 grams (0.314 mole) of a dialkyl fumarate in which each alkyl radical is derived from a commercial mixture of primary alkanols having 12 to 14 carbon atoms, 200 grams of benzene, and 1 gram of benzoyl peroxide at 45° C.–77° C. in a nitrogen atmosphere for 3.5 hours. The polymer is precipitated from the benzene solution with methanol and is found to have a nitrogen content of 3.2%.

EXAMPLE 10

A terpolymer of the acrylamide of Example 1, vinyl acetate, and a dialkyl fumarate in which each alkyl radical is derived from a commercial mixture of alkanols having from 12 to 16 atoms is prepared by placing 10 grams of the acrylamide, 24.8 grams of vinyl acetate, 165.2 grams of the fumarate, 1 gram of benzoyl peroxide and 150 grams of benzene in a sealed bottle and placing the bottle in a constant temperature bath at 60° C. for 18 hours. The polymer is precipitated from the benzene solution with methanol and is found to have a nitrogen content of 0.53%.

EXAMPLE 11

A terpolymer of the acrylamide of Example 1, N-vinyl pyrrolidone, and the dialkyl fumarate of Example 9 is prepared by placing 27.7 grams of the acrylamide, 18.2 grams of N-vinyl pyrrolidone, and 154 grams of the fumarate, 1 gram of benzoyl peroxide, and 150 grams of benzene in a sealed bottle in nitrogen atmosphere and placing the bottle in a constant temperature bath at 60° C. for 20 hours. The polymer is precipitated with methanol.

EXAMPLE 12

A terpolymer of the acrylamide of Example 1, N-vinyl oxazolidone, and the dialkyl fumarate of Example 9 is obtained by placing 35.5 grams of the acrylamide, 12.8 grams of N-vinyl oxazolidone, 151.7 grams of the fumarate, 0.2 gram of azobis-butyronitrile, and 150 grams of benzene in a sealed bottle in nitrogen atmosphere and placing the bottle in a constant temperature bath at 60° C. for 22 hours. The polymer is precipitated with methanol.

EXAMPLE 13

A terpolymer of the acrylamide of Example 1, isoprene, and the dialkyl fumarate of Example 9 is obtained by placing 28.7 grams of the acrylamide, 11.6 grams of isoprene, 159.7 grams of the fumarate, 0.2 gram of azobis-isobutyronitrile, and 150 grams of benzene in a sealed bottle in nitrogen atmosphere and placing the bottle in a constant temperature bath at 60° C. for 22 hours. The polymer is precipitated with methanol.

EXAMPLE 14

A copolymer of decyl acrylate (36 parts by weight) and the acrylamide of Example 2 (4 parts) is obtained by the procedure of Example 8. The copolymer is found to have a nitrogen content of 0.73% (theory: 0.71%).

EXAMPLE 15

A copolymer of decyl acrylate (36 parts by weight) and the acrylamide of Example 3 (4 parts) is prepared by the procedure of Example 8. The copolymer is found to have a nitrogen content of 0.51%.

EXAMPLE 16

A copolymer of decyl acrylate and N-1,1-dimethyl-3-oxobutyl acrylamide (85:15 weight ratio) is prepared by the procedure of Example 8.

EXAMPLE 17

A copolymer of acrylonitrile and the acrylamide of Example 1 is prepared by mixing together 80 grams (1.51 mole) of acrylonitrile, 20 grams (0.118 mole) of the acrylamide, 100 grams of tetrahydrofuran, and slowly adding at −25° C. an anionic polymerization catalyst formed by dissolving 2.3 grams (0.10 mole) of sodium metal and 12.8 grams (0.10 mole) of naphthalene in 30 grams of tetrahydrofuran. The mixture is allowed to warm to room temperature and an exothermic reaction occurs causing the temperature to rise to 50° C. The precipitated polymer is filtered from the solution and is purified by dissolving it in dimethyl formamide and reprecipitating by addition of methanol. The dried polymer is found to have a nitrogen content of 23.5%.

EXAMPLE 18

The N-1,1-dimethyl-3-oxobutyl acrylamide of Example 1 is polymerized by placing 50 grams of the acrylamide in 150 grams of liquid ammonia containing 2 grams of dissolved sodium metal at −70° C., stirring the mixture for one hour at −35° C. to −70° C., and then allowing the mixture to warm to room temperature with evaporation of the ammonia. The polymer is purified by dissolving it in aqueous 90% methanol, acidifying the solution with dilute hydrochloric acid, filtering the flocculent rubbery polymer which precipitates on standing, and washing it with water. The polymer is further purified by dissolving it in acetone and reprecipitating by addition of methanol. The dried polymer is found to have a nitrogen content of 8.03%.

The polymers and interpolymers of the N-3-oxohydrocarbon-substituted acrylamides of this invention are useful for many purposes. To a large extent, the particular utility of such polymers is associated with the presence of the oxo-radical in the acrylamide units. Thus, it has been found that the oxo-radical enhances the polar characteristic of the polymer and this results, for instance, in a greater detergency of the polymer when used as an additive in fuels or lubricants. It results also in a greater compatibility of the polymers with organic dyes so that synthetic fibers prepared from such polymers are readily susceptible to artificial coloring and further are characterized by a high degree of color-fastness.

When added to a lubricant, the polymers of the N-3-oxohydrocarbon-substituted acrylamides impart detergent properties, improve viscosity index values, and lower the pour point of the lubricant. Mineral lubricating oils are especially susceptible to such improvement. The commonly used oil are those having viscosity values ranging from about 50 SUS (Saybolt Universal seconds) at 100° F. to 500 SUS at 210° F. and are preferably refined mineral lubricating oils from SAE 5 to SAE 120 grades. Other lubricating oils such as vegetable oils, animal oils, silicon oils, and synthetic polyester oils, likewise are susceptible to improvement by the incorporation of the polymers. The concentration of the polymers in a lubricant ranges from 0.1% to 10%, more often from 0.5% to 5%.

Lubricants containing polymers of this invention may contain also other conventional additives such as metal detergents (e.g., barium didodecyl benzene-sulfonate, calcium mahogany sulfonate); inhibitors (e.g., zinc dioctylphosphorodithioate, dioctyl phosphite, phenyl beta-naphthylamine, 2,6-di-tert-butyl-4-methylphenol); load-carrying additives (e.g., chlorinated wax, dicyclohexyl disulfide); supplemental viscosity-index-improving agents; etc.

The viscosity index-improving properties of the polymers of this invention are illustrated by the results in Table I below. The base oil referred to in the results is a SAE 10W–30 mineral base oil having a viscosity value of 46.5 SUS/210° F. and a viscosity index value of 95. The concentration of the polymeric additive of this invention in the lubricant is 1.5% by weight.

TABLE I

| Lubricant: | Viscosity index value |
|---|---|
| Base oil | 95 |
| Base oil+Polymer of Example 8 | 140 |
| Base oil+Polymer of Example 11 | 111 |
| Base oil+Polymer of Example 13 | 107 |
| Base oil+Polymer of Example 14 | 137 |
| Base oil+Polymer of Example 15 | 123 |

The effectiveness of the polymers of this invention to lower the pour point of lubricants is shown by the results of Table II. The base oil referred to in these results is SAE 10 mineral lubricating oil having a pour point of −10° F.

TABLE II

| Lubricant: | Pour point, ° F. |
|---|---|
| Base oil | −10 |
| Base oil+0.25% of Polymer of Example 11 | −20 |
| Base oil+0.25% of Polymer of Example 12 | −15 |
| Base oil+0.25% of Polymer of Example 13 | −25 |

The effectiveness of the polymers of this invention as additives in lubricants to impart detergent properties is shown by the results (Table III below) of a detergency test. In this test a 350-cc. sample of a lubricating oil containing the detergent additive is placed in a 2″ x 15″ borosilicate tube. A steel panel is immersed in the oil. The sample is heated at 300° F. for 96 hours while air is bubbled through the oil at the rate of 10 liters per hour. The oxidized sample is cooled to 120° F., mixed with 0.5% of water, homogenized, allowed to stand at room temperature for 24 hours, and then filtered through two layers of No. 1 whatman filter paper at 20 mm. mercury pressure. The weight of the precipitate, washed with naphtha and dried, is taken as a measure of the effectiveness of the additive, i.e., the greater the weight of precipitate the less effective the additive. The lubricating oil used in the test is a Mid-Continent conventionally refined petroleum oil having a viscosity of about 200 SUS at 100° F. and containing 0.001% by weight of iron naphthenate (to promote oxidation).

TABLE III

| Lubricant | Detergency Test, mg. of sludge deposit/ 100 cc. sample |
|---|---|
| | Mg. |
| Base oil | 1,000 |
| Base oil +1.5% of the polymer of Example 8 | 3.2 |
| Base oil +1.5% of the polymer of Example 16 | 15 |
| Base oil +1.5% of the polymer of decyl acrylate and N-octyl acrylamide (85:15 weight ratio) | 205 |

The polymers of this invention are useful as additives in hydrocarbon fuels to impart resistance to deterioration and formation of sludge or varnish deposits in use or storage. For such use, the concentration of the polymers in a fuel may be as low as 0.001%, usually from 0.005% to 0.1%.

What is claimed is:

1. An N-3-oxohydrocarbon-substituted acrylamide having the structural formula

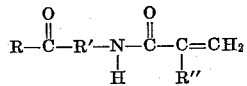

wherein R and R″ are each selected from the class consisting of hydrogen and lower alkyl radicals and R′ is a lower alkyl-substituted ethylene radical.

2. The acrylamide of claim 1 wherein R is a methyl radical.

3. The acrylamide of claim 1 wherein R″ is a hydrogen radical.

4. The acrylamide of claim 1 wherein R′ is a dialkyl-substituted ethylene radical.

5. An N-3-oxohydrocarbon-substituted acrylamide having the structural formula

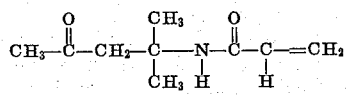

6. An N-3-oxohydrocarbon-substituted acrylamide having the structural formula

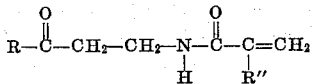

wherein R and R″ are each selected from the class consisting of hydrogen and lower alkyl radicals.

7. The process for preparing N-3-oxohydrocarbon-substituted acrylamides comprising reacting at a temperature below about 100° C. a mixture of an acrylonitrile and one mole of a beta-hydroxy oxohydrocarbon with at least one mole of sulfuric acid per mole of acrylonitrile used.

8. The process of claim 7 wherein the lower beta-hydroxy oxohydrocarbon is an aliphatic beta-hydroxy ketone.

9. The process of claim 7 wherein the lower beta-hydroxy oxohydrocarbon is formed in situ from an oxohydrocarbon having at least one alpha-hydrogen atom.

10. The process of claim 7 wherein the beta-hydroxy oxohydrocarbon is formed in situ from a methyl ketone.

11. The process for preparing N-3-oxohydrocarbon-substituted acrylamides comprising reacting at a temperature below about 100° C. a mixture of an acrylonitrile and two moles of an aliphatic oxohydrocarbon having at least one alpha-hydrogen atom with at least one mole of sulfuric acid per mole of acrylonitrile used.

12. The process for preparing N-3-oxohydrocarbon-substituted acrylamides comprising reacting a mixture of acrylonitrile and two moles of a methyl ketone with at least one mole of sulfuric acid per mole of acrylonitrile used at a temperature below about 100° C.

13. The process of claim 12 wherein the methyl ketone is acetone and the temperature is between about 0° C. and 100° C.

14. A polymer of an N-3-oxohydrocarbon-substituted acrylamide having the structural formula:

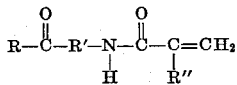

wherein R and R″ are each selected from the class consisting of hydrogen and lower alkyl radicals having up to about 10 carbon atoms and R′ is a lower alkyl-substituted ethylene radical having up to about 10 carbon atoms per alkyl.

15. A copolymer of an N-3-oxohydrocarbon-substituted acrylamide of claim 14 with a polymerizable vinyl monomer.

16. A copolymer of from about 1% to about 50% of an N-3-oxohydrocarbon-substituted acrylamide of claim 14 and from about 50% to about 99% of an alkyl acrylate having from about 8 carbon atoms to about 30 carbon atoms in the alkyl radical.

17. A copolymer of claim 15 wherein said polymerizable vinyl monomer is a vinyl cyclic hydrocarbon selected from the class consisting of N-vinyl pyrrolidone, N-vinyl oxazolidone, N-vinyl carbazol, styrene and vinyl pyridine.

18. A copolymer of claim 15 wherein the polymerizable vinyl monomer is a vinyl nitrile selected from the class consisting of acrylonitrile and methacrylonitrile.

19. A terpolymer of the N-3-oxohydrocarbon-substituted acrylamide of claim 14, the vinyl ester of a saturated acid, and the ester of a saturated alcohol and an unsaturated acid selected from the class consisting of acrylates, methacrylates, fumarates, and maleates.

20. A terpolymer of the N-3-oxohydrocarbon-substituted acrylamide of claim 14, a vinyl cyclic hydrocarbon, and the ester of a saturated alcohol with an unsaturated acid selected from the group consisting of acrylates, methacrylates, fumarates, and maleates.

21. A terpolymer of the N-3-oxohydrocarbon-substituted acrylamide of claim 14, an unsaturated hydrocarbon, and the ester of a saturated alcohol with an unsaturated acid selected from the class consisting of acrylates, methacrylates, fumarates and maleates.

22. A homopolymer of an N-3-oxohydrocarbon-substituted acrylamide having the structural formula:

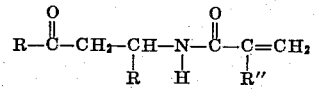

wherein R and R'' are each selected from the class consisting of hydrogen and lower alkyl radicals having up to about 10 carbon atoms.

23. A homopolymer of the N-3-oxohydrocarbon-substituted acrylamide having the structural formula:

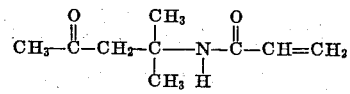

24. A copolymer of the N-3-oxohydrocarbon-substituted acrylamide of claim 23 with a polymerizable vinyl monomer.

25. The process for preparing N-3-oxohydrocarbon-substituted acrylamides comprising reacting a mixture of acrylonitrile and about one mole of an alpha,beta-unsaturated ketone with at least about one mole of sulfuric acid per mole of acrylonitrile used at a temperature below about 100° C.

26. The process for preparing N-3-oxohydrocarbon-substituted acrylamides comprising reacting a mixture of acrylonitrile and about one mole of mesityl oxide with at least about one mole of sulfuric acid per mole of acrylonitrile used at a temperature below about 100° C.

References Cited by the Examiner

UNITED STATES PATENTS

| | | | |
|---|---|---|---|
| 2,555,646 | 6/1951 | Jones | 260—65 |
| 2,561,205 | 7/1951 | Jones | 260—561 |
| 2,628,977 | 2/1953 | Grigsby | 260—561 |
| 2,830,954 | 4/1958 | Dixon | 252—51.5 |
| 2,865,889 | 12/1958 | Blanchette | 260—63 |
| 2,892,786 | 6/1959 | Stewart et al. | 252—51.5 |
| 2,974,123 | 3/1961 | Ketterer | 260—63 |

WILLIAM H. SHORT, *Primary Examiner.*

DANIEL E. HYMAN, *Examiner.*

P. P. GARVIN, L. M. MILLER, *Assistant Examiners.*

UNITED STATES PATENT OFFICE
CERTIFICATE OF CORRECTION

Patent No. 3,277,056                              October 4, 1966

Lester E. Coleman

It is certified that error appears in the above identified patent and that said Letters Patent are hereby corrected as shown below:

Column 2, line 46, "arcyl-" should read -- acryl- --. Column 3, line 72, "of", first occurrence, should read -- or --. Column 6, line 27, "droxy-4-methyl-6-pentanone" should read -- droxy-4-methyl-2-pentanone --; line 31, "with", second occurrence, should read -- and --.

Signed and sealed this 22nd day of December 1970.

EAL)

ttest:

lward M. Fletcher, Jr.                      WILLIAM E. SCHUYLER, JR.

ttesting Officer                               Commissioner of Patents